United States Patent

Bruckenstein et al.

[15] 3,663,889

[45] May 16, 1972

[54] COMBINATION CURRENT CONTROL - VOLTAGE CONTROL CIRCUIT

[72] Inventors: Stanley Bruckenstein, Amherst, N.Y.; Barry Miller, Murray Hill, N.J.

[73] Assignee: Bell Telephone Laboratories, Incorporated, Murray Hill, N.J.

[22] Filed: Mar. 30, 1970

[21] Appl. No.: 23,851

[52] U.S. Cl. ................................330/102, 330/103, 330/110

[51] Int. Cl. ................................................H03f 1/36

[58] Field of Search ................................330/102–104, 110

[56] References Cited

UNITED STATES PATENTS 3,436,673 4/1969 Fricke ................................330/104 X

*Primary Examiner*—Roy Lake
*Assistant Examiner*—James B. Mullins
*Attorney*—R. J. Guenther and Edwin B. Cave

[57] ABSTRACT

A single control amplifier in combination with two loop control paths, one of which includes a switch, provides selectively for establishing a preselected voltage or a preselected current without distorting the output by either limiting or transients. Operation of the switch allows shifting between the voltage control mode and the current control mode.

2 Claims, 3 Drawing Figures

INVENTORS S. BRUCKENSTEIN
B. MILLER
BY
ATTORNEY

COMBINATION CURRENT CONTROL - VOLTAGE CONTROL CIRCUIT

BACKGROUND OF THE INVENTION

1. Field of the Invention

This invention relates to electrical control circuits and more particularly to circuits which may be used selectively to control either voltage or current.

2. Description of the Prior Art

It is well known that active circuit such as operational amplifiers may be employed in closed loop configurations to control either the potential or the current through an electrode. It is also known that such circuits are far superior to circuits employing only passive elements.

An important limitation in prior art circuits of this type which severely restricts their utility in a wide variety of applications is that shifting or changing from one control situation to another and back again can only be achieved by opening the control loop which causes the controlling element to limit. One approach toward the solution of this problem is shown by T. B. Warner and S. Schuldiner in an article entitled, "Rapid Electronic Switching Between Potentiostatic and Galvanostatic Control," *Journal Electrochemical Society*, Vol. 114, page 359, (Apr. 1967). There, a back-biased diode is employed to open the loop. The same pulse that limits the voltage control portion for potentiostatic action is employed in the current or galvanostatic mode as the voltage source to supply the required current through a series resistance. Although this current appears to function satisfactorily in transferring from a controlled potential to a controlled current, distortion in the form of potential overshoots occurs on the re-establishment of potentiostatic control. In many applications, such as those involving the precise control of electrochemical cells for example, distortion of that type is completely unacceptable.

It may be noted, in general, that any attempt to change the control function of a single closed loop operational amplifier circuit that involves opening the loop, necessarily produces an unstable condition evidenced by undesirable electrical transients in the supposedly controlled system.

Accordingly, a broad object of the invention is to avoid both limiting and distortion-producing transients in electrical control circuits which otherwise have the capability of shifting back and forth between voltage control and current control.

SUMMARY OF THE INVENTION

The stated object and additional objects are achieved in accordance with the principles of the invention by employing two closed loop paths in combination with a common control amplifier. One control function, potentiostatic, is effected when one loop is closed while the second control function, galvanostatic, is imposed when the second loop is closed. A key feature of the invention is that the second loop, in effect, simultaneously performs two functions. First, it negates the control function of the first loop and second, it establishes the desired control function.

In accordance with the invention, negation of the control condition established by the first loop is accomplished by the unique use of an inverting amplifier whose output is made the negative sum of every signal fed to the input of the control amplifier. The input to the inverter and the negative input to the control amplifier are applied from a common signal source by way of identical impedances, The output of the inverter is connected to the negative input of the control amplifier by way of a switch. Selecting the magnitude of various associated circuits elements in accordance with the invention ensures that the closing of the switch will produce a zero output voltage at the control amplifier. Thus, in effect, the first closed loop is opened since the output current of the control amplifier drops to zero. In accordance with the invention, since only a single control amplifier is employed for both control loops and at least one closed loop always exists regardless of the switch position, control is maintained at all times without, however, the creation of any spurious potentials or current transients when switching from one mode to the other.

The invention as described herein is presented in terms of a control system for providing, alternatively, voltage or current control. In its broader aspects, however, the invention is directed to a closed loop servo control system employing two or more control states. For example, the control states may be amplitude and frequency or pressure and flow rate, rather than current and voltage.

DETAILED DESCRIPTION

Figure 1:
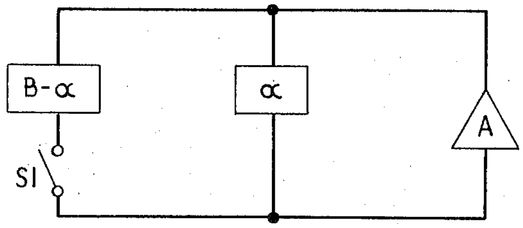
FIG. 1 is a block diagram of a circuit illustrating the principles of the invention.

In FIG. 1,$\alpha$ represents a closed loop function imposed by a control amplifier A. When the switch S-1 is closed, a second control function indicated by $\beta$-$\alpha$ is imposed on the control amplifier so that the initial $\alpha$ function is canceled and a new resulting condition, $\beta$, is imposed. The control function $\alpha$ represents that function which is employed when the apparatus operates as a potentiostat, while the $\beta$ function represents the function employed when the apparatus is utilized as a galvanostat.

A key feature of the invention, which is discussed in greater detail hereinbelow, is the use of a simple switch S–1 to introduce the $\beta$ function by effecting cancellation of the $\alpha$ function and which, when open, re-establishes the $\alpha$ function without, however, in either case, permitting the opening of both control loops. Stated briefly, in a circuit in accordance with the invention, an operative control loop is maintained around the amplifier even when shifting between modes of operation.

Figure 2:
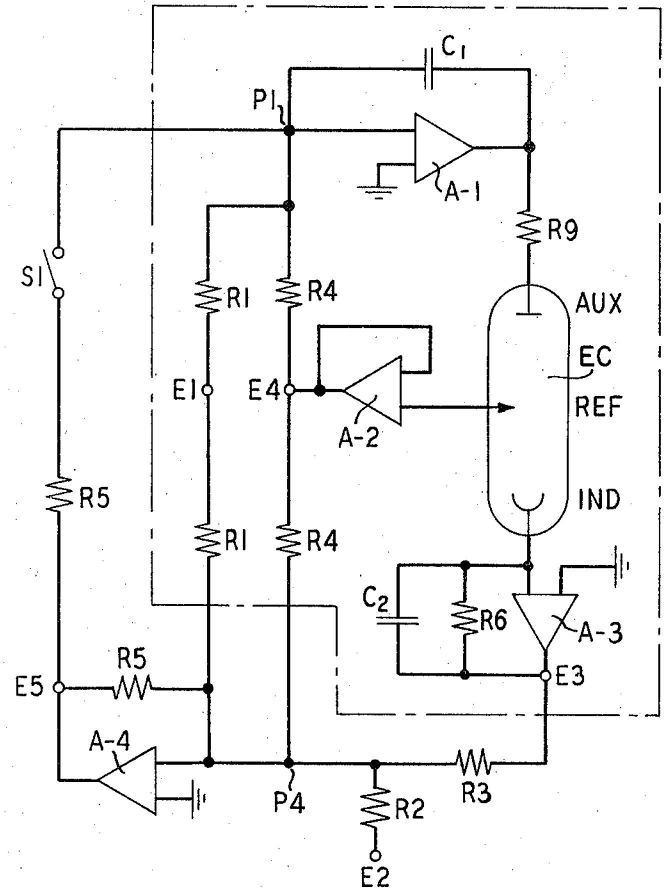
FIG. 2 is a detailed schematic circuit diagram of the circuit of FIG. 1 shown in use as a combination potentiostat and galvanostat for an electrical cell.

In FIG. 2 apparatus in accordance with the invention is shown being employed as a combination potentiostat-galvanostat for the control of an electrochemical cell EC. It is to be understood, however, that the principles of the invention may be employed broadly for any current-voltage control arrangement wherein the capability of transient-free switching between voltage and current control may profitably be utilized.

That portion of FIG. 2 enclosed within the dotted line represents conventional prior art means for providing potentiostatic control of an indicator or working electrode IND in a chemical cell EC. A requirement for the potentio-static circuit shown is the application of a potential $E_1$ between the indicator electrode IND and a reference electrode REF. A summing point at terminal $P_1$ is connected to an auxiliary electrode AUX in the cell EC by way of a control amplifier A–1 in series with a resistor $R_9$. A capacitor $C_1$ is connected in the feedback path of the A–1 amplifier. The summing point $P_1$ is in turn connected to the potential input terminal $E_1$ by way of a resistor $R_1$ and to the output terminal of a second amplifier A–2 by way of a resistor $R_4$. The reference electrode REF is connected directly to the input of the amplifier A–2 which is employed as a simple voltage follower. The control amplifier A–1 is in the balanced condition when the currents at its summing point $P_1$ sum to zero. The potential of the indicator electrode IND is controlled by the amplifiers in the closed loop which include the previously mentioned amplifiers A–1 and A–2 and a third amplifier A–3, although the current follower action maintains the indicator electrode potential at substantially ground level.

In the conventionally employed version of this circuit, the resistors $R_1$ and $R_4$ are equal in magnitude and the potential $E_1$ may be any function of time produced by a suitable signal generator. The current $i_D$ through the indicator electrode IND may be expressed as follows:

$$i_D = -E_3/R_6 \quad (1)$$

where $E_3$ is the voltage at the terminal so designated.

In accordance with the invention, galvanostatic control is introduced by connecting the terminals $P_1$ and $E_3$ by a loop which includes a fourth amplifier A-4 and a switch S-1. When the switch S-1 is closed, a constant current condition is imposed upon the indicator electrode IND, replacing the potentiostatic control mode.

In accordance with a key aspect of the invention, the currents at the points indicated and the magnitudes of the resistors indicated must conform to the following relation or, stated otherwise, the summing point restraint at the input of the inverting amplifier A-4 requires that $E_1/R_1+E_2/R_2+E_3/R_3+E_4/R_4+E_5/R_5=0$ (2)

The summing point restraint for the potentiostatic condition may be stated as follows:

$$E_1/R_1+E_4/R_4=0 \qquad (3)$$

When the switch S-1 is closed, the new summing point restrain at $P_1$, the negative input of control amplifier A-1, requires that $$E_1/R_1+E_4/R_4+E_5/R_5=0 \qquad (4)$$

Solving Equations (1), (2) and (4) for the controlled cell current gives $$i_D=(E_2\,R_3)/R_6\,R_2) \qquad (5)$$

the potential $E_2$ may also be any function of time supplied by an appropriate signal generator.

Figure 3:
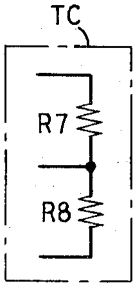
FIG. 3 is a schematic circuit diagram of a simplified test cell.

For illustrative purposes, the chemical cell EC of FIG. 2, may also be considered in terms of the test cell TC shown in FIG. 3 where the free terminal of the resistor $R_7$, the common terminal of resistors $R_7$ and $R_8$, and the free terminal of resistor $R_8$ correspond, respectively, to the AUX, REF and IND electrodes of the chemical cell EC. From this correspondence it is evident that for the controlled current mode $$i_D=E_4/R_8 \qquad (6)$$

or for the controlled voltage mode, $$E_4=i_D\,R_8 \qquad (7)$$

In one test of the circuit shown in FIG. 2, a common signal source was used for the $E_1$ and $E_2$ supply voltages, switch S-1 being closed. The outputs of the current follower and of the voltage follower were recorded versus $E_2$ on a conventional X-Y-Y' recorder. Within the control limits of the operational amplifier, the recorded slopes corresponded within the limits of recorder accuracy (approximately 0.2 per cent) to those which would be predicted from the particular resistance values employed. The currents controlled varied from $10^{-7}$ amperes to $10^{-2}$ amperes. Scanning $E_1$ along with $E_2$ had no effect upon the control current nor did stepping $E_1$ by ±1 volt about any preset value of $E_2$. The independence of the circuit performance of $E_1$, as shown by the test, clearly demonstrates the negation of potentiostatic control in the loops A-1, A-2 and A-3 by the inverting amplifier A-4 and the effective transfer to current control on closing the second loop from one.

It is to be understood that the embodiment described herein is merely illustrative of the principles of the invention. Various modifications thereto may be effected by persons skilled in the art without departing from the spirit and scope of the invention.

What is claimed is:

1. A control system for selectively providing a preselected initial state or preselected subsequent state comprising, in combination, a closed loop servo, a first control loop including means providing a first control function for said servo for establishing said initial control state, at least one additional control loop including means providing an additional control function for said servo for establishing one of said subsequent states and switching means for shifting said control system between said states, said additional control loop further including means for canceling out said first control function, whereby upon the operation of said switching means, at least one of said loops remains operative, thereby ensuring a smooth transition between said states.

2. Apparatus for selectively providing a controlled voltage or a controlled current comprising, in combination, a common control operational amplifier employing first and second control loops, said first loop including means for providing a preselected voltage level, said second loop including means for providing a preselected current level, said second loop further including switching means for shifting said apparatus between a voltage control mode and a current control mode and means operative upon the energization of said second loop for balancing out the control signal function of said first loop, whereby said shifting is accomplished with uninterrupted continuity in one of said loops thereby ensuring against spurious potentials or current transients.

* * * * *